United States Patent
Rae

Patent Number: 5,762,460
Date of Patent: Jun. 9, 1998

[54] TRUCK LEVELER

[75] Inventor: John G. Rae, Aurora, Canada

[73] Assignee: Kelley Atlantic Ltd., Ontario, Canada

[21] Appl. No.: 673,434

[22] Filed: Jun. 28, 1996

[51] Int. Cl.$^6$ .................................................. E01D 15/00
[52] U.S. Cl. .......................... 414/401; 14/69.5; 14/71.7; 254/88; 414/786; 414/584
[58] Field of Search .................... 414/401, 396, 414/584, 786; 14/69.5, 71.7; 254/88

[56] References Cited

U.S. PATENT DOCUMENTS

| | | | |
|---|---|---|---|
| 770,652 | 9/1904 | Posey | 14/69.5 |
| 2,560,064 | 7/1951 | Astry | 414/584 |
| 3,178,156 | 4/1965 | Rigers | 254/88 |
| 3,630,487 | 12/1971 | Wechter, Jr. | 254/88 |
| 3,818,528 | 6/1974 | Petersen | 14/69.5 |
| 4,165,862 | 8/1979 | Bennett | 254/88 |
| 4,427,179 | 1/1984 | Price | 254/88 X |
| 4,726,516 | 2/1988 | Cree | 14/69.5 X |
| 4,765,792 | 8/1988 | Cherry et al. | 414/401 |
| 4,817,224 | 4/1989 | Visnaw et al. | 14/69.5 |
| 4,819,910 | 4/1989 | Johnston | 254/88 |
| 4,969,792 | 11/1990 | Ellis et al. | 414/401 |
| 4,986,405 | 1/1991 | Alten | 14/69.5 |

FOREIGN PATENT DOCUMENTS

| | | | |
|---|---|---|---|
| 1148982 | 7/1957 | France | 14/71.7 |
| 2611682 | 9/1988 | France | 414/401 |

*Primary Examiner*—David A. Bucci
*Attorney, Agent, or Firm*—Michael, Best & Friedrich

[57] ABSTRACT

A loading dock having a truck leveler for allowing the truck to be positioned at different heights. The loading dock includes a dock surface, a driveway extending from the dock surface and positioned at a level below the dock surface, and a ramp movably interconnected with the driveway. The driveway defines a tire path along which a truck tire will travel when a truck is backed toward the dock surface. The ramp is movable from an active position aligned with the tire path to an inactive position out of the tire path. The ramp can be pivotally interconnected with the driveway. Alternatively, the ramp can be linearly slidably interconnected with the driveway. In either embodiment, a power actuator (e.g., a hydraulic cylinder) can be operatively connected with the ramp and positioned to pivot the ramp between the active and inactive positions.

11 Claims, 4 Drawing Sheets

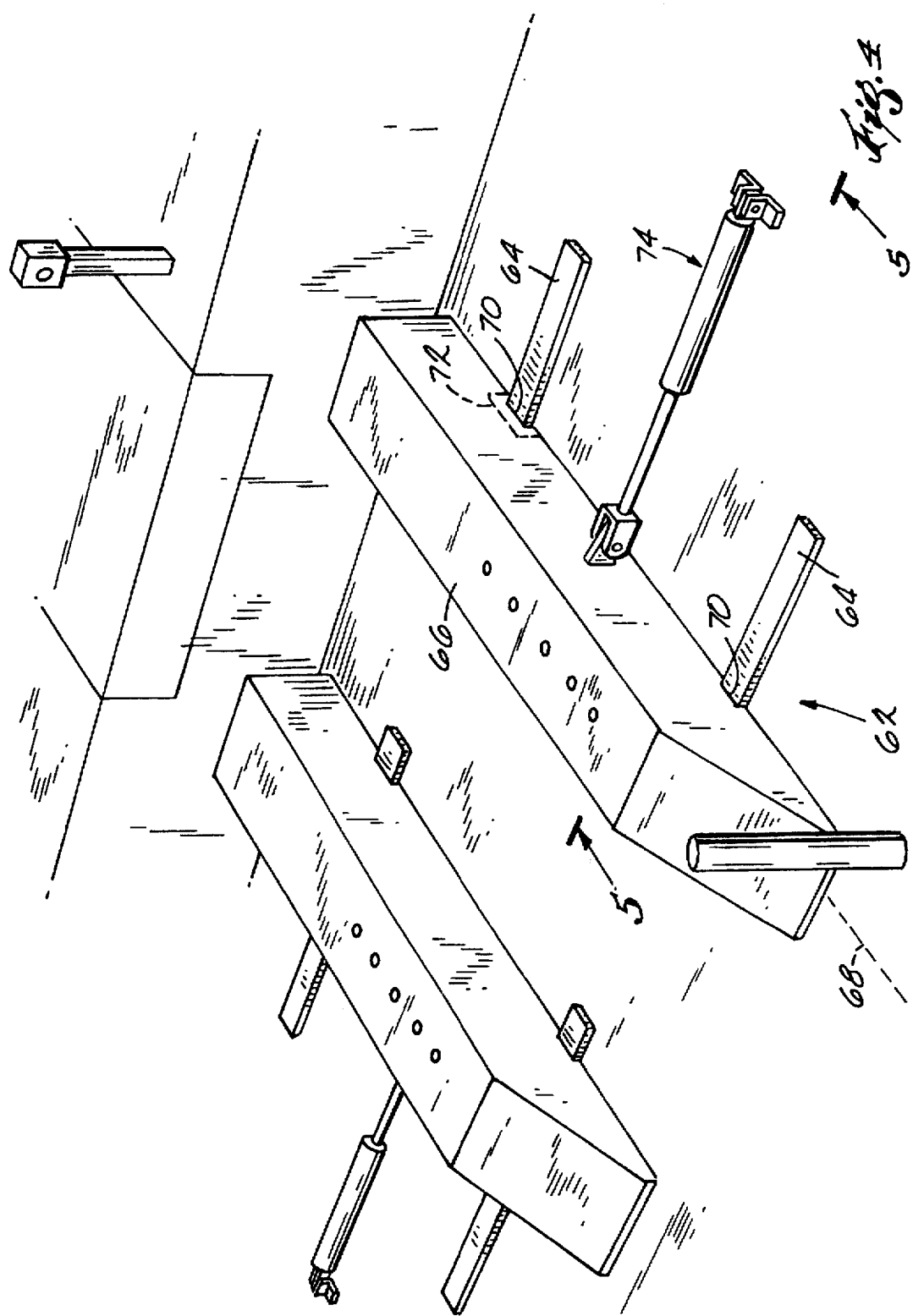

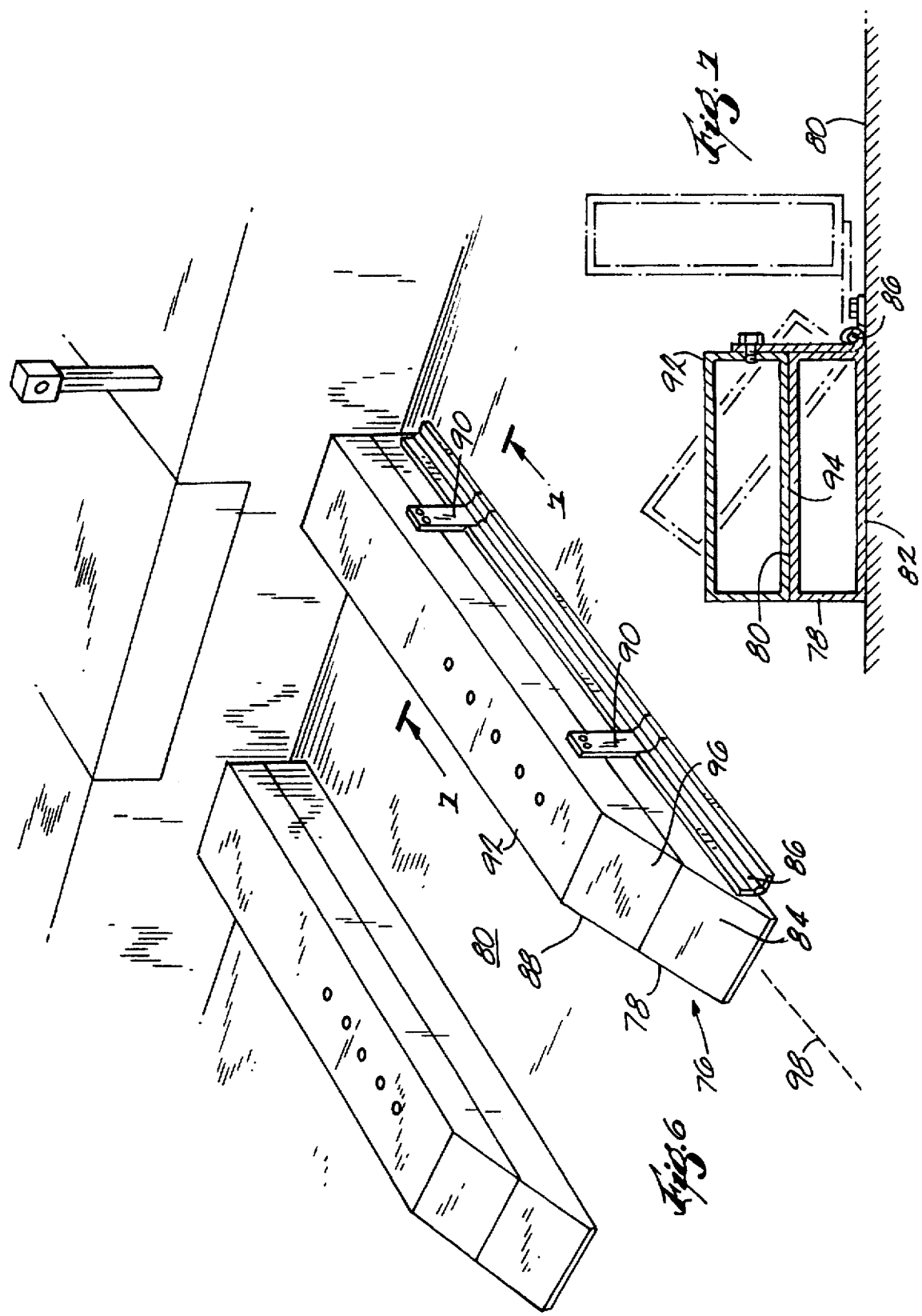

TRUCK LEVELER

FIELD OF THE INVENTION

The present invention generally relates to the field of truck levelers, which are devices that adjust the vertical height of the back end of a truck so that the truck can be loaded and/or unloaded from a loading dock.

BACKGROUND OF THE INVENTION

Loading docks are commonly used to facilitate loading and unloading of trucks that are positioned on a driveway. Loading docks typically include a dock surface that is raised a certain distance above the driveway. The dock surface is designed to be approximately level with the truck bed so that vehicles (e.g., forklifts) can drive from the loading dock to the truck bed to load and unload cargo.

The height of truck beds (i.e., above the driveway) can vary considerably from truck to truck. In order to accommodate these differences, many loading docks include dock levelers that provide a ramped surface between the dock surface and the truck bed. The ramped surface is provided by a pivotable platform, as is generally known in the art.

Dock levelers are designed to handle a certain range of truck bed heights. However, certain trucks have a truck bed that is either too low or too high for some dock levelers to handle. In this situation, a truck leveling device can be used to raise or lower the back end of the truck to thereby adjust the height of the truck bed. Truck leveling devices commonly include a platform that is positioned over a pit in the driveway. The front edge of the platform is pivotally mounted to the driveway, and hydraulic cylinders are used to pivot the platform. When a truck is backed into the loading dock, the rear wheel of the truck or trailer will be positioned on the platform. The platform can be lowered or raised to position the truck bed at an appropriate height. Truck levelers are commonly used in conjunction with dock levelers. A truck leveler is illustrated in U.S. Pat. No. 4,969,792.

While truck levelers are an effective way to allow loading docks to handle a variety of truck bed heights, they tend to be quite expensive due to the size of the platform. Furthermore, since the platform can be required to support a loaded truck, the hydraulic cylinders required lift the truck can be large and expensive. In addition, such truck levelers require significant labor to install due to the provision of a pit in the driveway.

SUMMARY OF THE INVENTION

The present invention attempts to alleviate one or more of the above-noted problems by providing a truck leveler that does not use hydraulic cylinders to support the truck, and further do not require the use of a large platform. Furthermore, the present invention does not require a pit to be formed in the driveway.

In one aspect, the patent is directed to a loading dock having a truck leveler for allowing the truck to be positioned at different heights. The loading dock includes a dock surface, a driveway extending from the dock surface and positioned at a level below the dock surface, and a ramp movably interconnected with the driveway. The driveway defines a tire path along which a truck tire will travel when a truck is backed toward the dock surface. The ramp is movable from an active position aligned with the tire path to an inactive position out of the tire path.

The ramp can be pivotally interconnected with the driveway. For example, the pivotal interconnection is provided by a hinge having a first member securely interconnected with the driveway and a second member pivotally secured to the first hinge member and securely interconnected with the ramp. Preferably, the ramp rotates about 90° when moving from the active position to the inactive position. Alternatively, the ramp can be linearly slidably interconnected with the driveway. For example, the slidable interconnection can be provided by a track securely interconnected with the driveway and slidably interconnected with the ramp. Preferably, the track extends from the ramp in a direction that is transverse (e.g., substantially perpendicular) to the tire path. In either embodiment, a power actuator (e.g., a hydraulic cylinder) can be operatively connected with the ramp and positioned to pivot the ramp between the active and inactive positions.

In another aspect, the present invention provides a method of positioning a truck at a loading dock having a dock surface, a driveway defining a tire path, and a ramp movably interconnected with the driveway. The method includes the steps of moving the ramp from an active position aligned with the tire path to an inactive position out of the tire path, and backing the truck over the driveway and toward the dock surface such that a tire of the truck travels along the tire path. The moving step can include the step of pivoting the ramp (e.g., about an axis that is substantially parallel to the tire path). Preferably, the pivoting step comprises pivoting the ramp about 90°. Alternatively, the moving step can include the step of linearly moving the ramp. For example, the linearly moving step can include moving the ramp in a direction oblique (e.g., substantially perpendicular) to the tire path.

In another aspect, the present invention provides a multi-position ramp adapted to be positioned on a base surface. The ramp includes a first ramp member having a bottom surface adapted to be positioned on the base surface, a top surface adapted to support a vehicle when the bottom surface is positioned on the base surface, and a first inclined surface adapted to act as a ramp to the top surface when the bottom surface is positioned on the base surface. The ramp further includes a second ramp member pivotally connected to the first ramp member and including a second inclined surface. The second ramp member is movable (e.g., pivotable) relative to the first ramp member between an active position, where the second inclined surface acts as an extension of the first inclined surface, and an inactive position.

BRIEF DESCRIPTION OF THE DRAWINGS

FIG. 4 is a perspective view of a second embodiment of the present invention.

FIG. 6 is a perspective view of a third embodiment of the present invention.

FIG. 7 is a section view taken along line 7—7 in FIG. 6.

DETAILED DESCRIPTION

Figure 1:
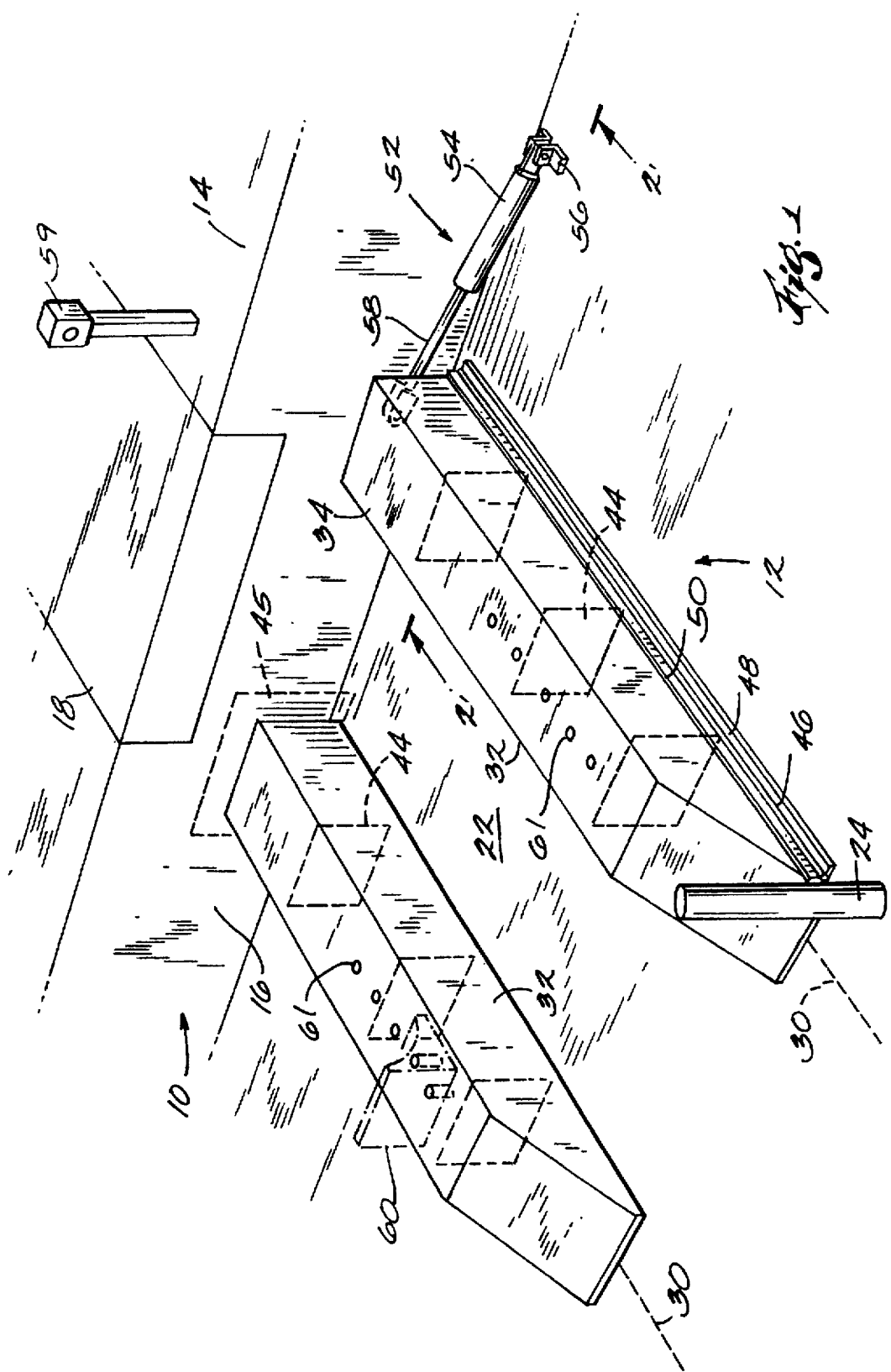
FIG. 1 is a perspective view of a loading dock embodying the present invention.
Figure 2:
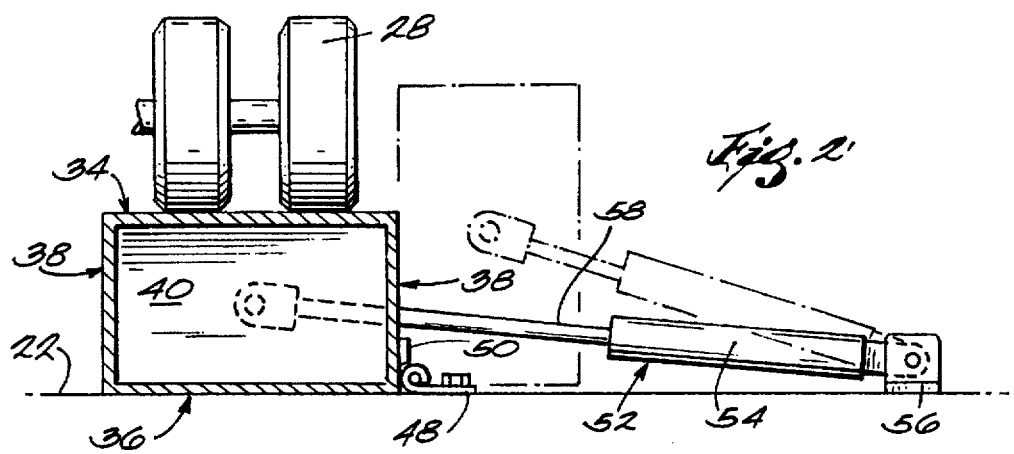
FIG. 2 is a section view taken along line 2—2 in FIG. 1.
Figure 3:
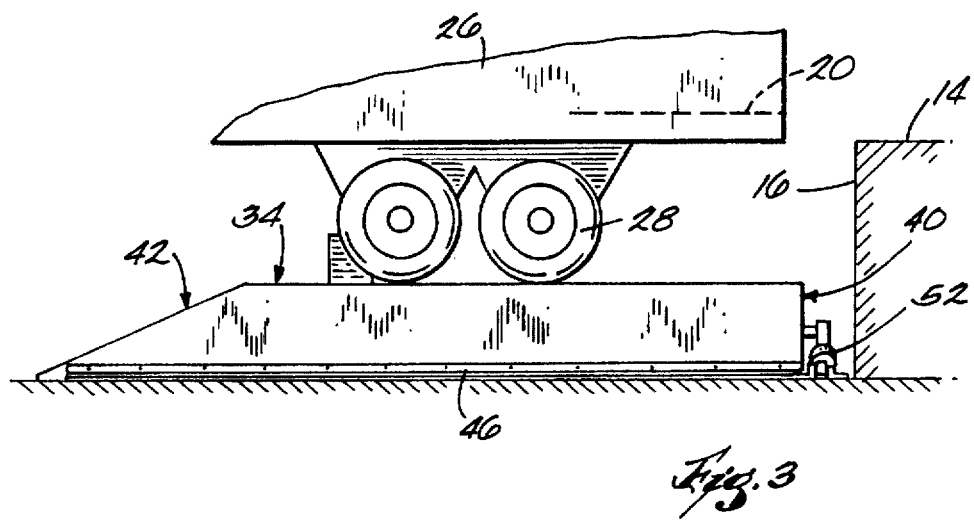
FIG. 3 is a side view of the loading dock of FIG. 1.

FIGS. 1–3 illustrate a loading dock 10 having a truck leveler 12 embodying one or more aspects of the present invention. The loading dock 10 includes a substantially horizontal dock surface 14 and a substantially vertical front wall 16. A dock leveler 18 is mounted to the dock surface 14 to allow fork lifts (not shown) to drive from the dock surface 14 onto truck beds 20 (FIG. 3) of varying heights. A driveway 22 extends outwardly from the lower edge of the front wall 16, and is at a level below the dock surface 14. An alignment post 24 provides a physical and visual marker for determining the proper location of a truck 26 as it is backed toward the dock surface 14. In this regard, the tires 28 of the truck 26 are designed to be backed toward the dock surface 14 along a tire path 30.

The illustrated truck leveler 12 includes two ramps 32 that are essentially mirror images of each other. For the sake of brevity, only one of the ramps will be described below. The ramp 32 is a substantially box-shaped structure having a top surface 34, a bottom surface 36, two side surfaces 38, a back surface 40 and an inclined surface 42. Each of the surfaces can be formed using appropriate steel plate, and the top surface 34 and inclined surface 42 preferably include a non-slip checker plate surface (not illustrated). The interior of the ramp 32 can include gussets 44 in the form of rectangular steel plates to provide support to the top surface 34 of the ramp 32.

In accordance with the present invention, the ramp 32 is movably interconnected with the driveway 22 such that the ramp 32 is movable from an active position aligned with the tire path 30 to an inactive position out of the tire path 30. In the embodiment illustrated in FIGS. 1–3, the movable interconnection is provided by a hinge 46 having a first member 48 secured to the driveway 22 and a second member 50 pivotally secured to the first member 48. The second member 50 is secured to the ramp 32 at a lower edge of one of the side surfaces 38. The hinged interconnection allows the ramp 32 to be pivoted from an active position (solid line in FIG. 2) to an inactive position (dashed lines in FIG. 2).

In the active position, the ramp 32 is aligned with the tire path 30 such that a truck 26 being backed toward the loading dock 10 will drive up the inclined surface 42 onto the top surface 34, thereby raising the effective height of the truck bed 20 relative to the dock surface 14. The use of the ramp 32 in the active position is particularly useful for trucks 26 having a low bed height. Alternatively, with the ramp 32 in the inactive position, the ramp 32 will be out of the tire path 30. Accordingly, as a truck 26 is backed toward the loading dock 10, the truck 26 will stay on the driveway 22 and will not drive up the inclined surface 42. The use of the ramp 32 in the inactive position is useful for trucks 26 having a normal or high truck bed height.

The truck leveler 12 can further include an actuator for moving the ramp 32 between the active and inactive positions. In the illustrated embodiment, the actuator is a hydraulic cylinder 52 having a cylinder portion 54 pivotally secured to a base plate 56 and a piston rod 58 pivotally secured to the back surface 40 of the ramp 32. If desired, the actuator can be controlled by a remote control 59 (FIG. 1) that provides push button activation of the actuator.

Instead of being automatically actuated, the ramp 32 could instead be manually moved between the active and inactive positions. In order to minimize physical exertion by operating personnel, the ramp 32 could be counterbalanced 45 (illustrated schematically by dashed lines in FIG. 1) by various means, including a mechanical spring, additional dead weight on the ramp 32 such that the center of gravity of the ramp 32 is at or near the pivot point in a vertical plane, and/or additional dead weight added to the ramp 32 such that the pivot point is at or near the center of gravity of the ramp 32 in both the vertical and horizontal planes.

A wheel chock 60, having pegs (not shown) extending from a bottom surface, can be inserted into corresponding holes 61 in the top surface 34 to secured the truck in place.

Figure 5:
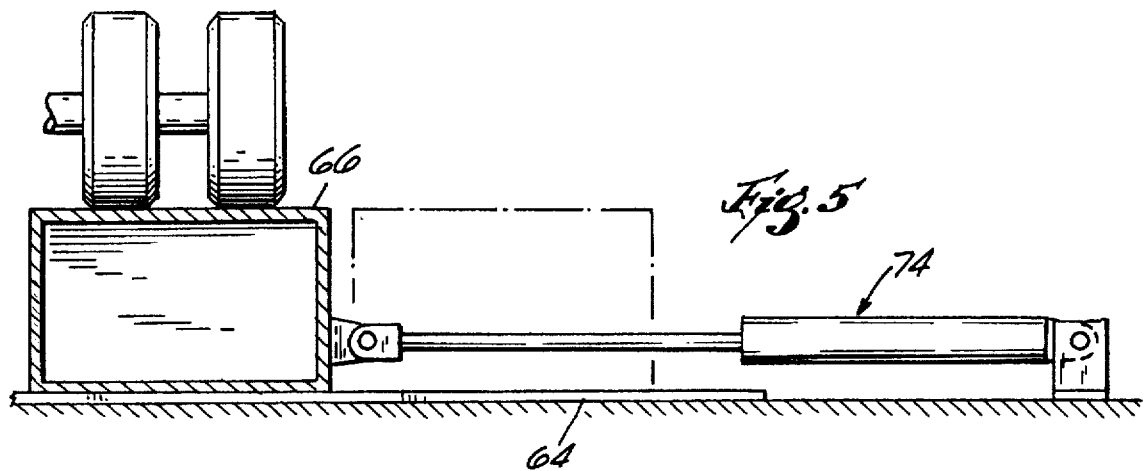
FIG. 5 is a section view taken along line 5—5 in FIG. 4.

FIGS. 4 and 5 illustrates a second embodiment of the present invention wherein the ramps are linearly slid between the active and inactive positions. More specifically, the illustrated truck leveler 62 includes tracks 64 that extend from the ramp 66 in a direction that is transverse to the tire path 68. In the illustrated embodiment, the direction is substantially perpendicular to the tire path 68. The tracks 64 slidably engage the ramp 66 so that the ramp 66 can be slid laterally relative to the tire path 68. In this regard, the ramps 66 include lateral slots 70 that slidably receive the tracks 64. The slots 70 are provided with rollers 72 (illustrated schematically by dashed lines in FIG. 4) to decrease the frictional interaction between the ramp 66 and the tracks 64. Similar to the previous embodiment, an actuator is used to move the ramp 66 between the active an inactive positions. In the illustrated embodiment, the actuator is a hydraulic cylinder 74.

Instead of being automatically actuated, the ramp 66 could instead be manually moved between the active and inactive positions. In this regard, the rollers 72 can be spring loaded such that the ramp is free to move when no load is on the ramp. When a load is applied to the ramp (i.e., by a truck), the ramp would lower, due to compression of the roller springs, until the ramp contacts the ground or base plate, thereby substantially limiting movement of the ramp.

FIGS. 6 and 7 illustrate a third embodiment of the present invention wherein the ramp can be selectively adjusted between two different heights. The ramp 76 includes a first ramp member 78 having a first top surface 80, a first bottom surface 82 and a first inclined surface 84. Similar to the embodiment of FIGS. 1–4, the first ramp member 78 is secured to a hinge 86 that allows the first ramp member 78 to be pivoted relative to the driveway 80. A second ramp member 88 is pivotally interconnected with the hinge 86 via a plurality of arms 90. The second ramp member 88 includes a second top surface 92, a second bottom surface 94 and a second inclined surface 96. The second ramp member 88 is positioned such that it can be pivoted between an active position, wherein the second bottom surface 94 is in contact with the first top surface 80, and an inactive position, wherein the second ramp member 88 is pivoted out of the tire path 98 (dashed lines in FIG. 6).

When the second ramp member 88 is in the active position, the second inclined surface 96 acts as an extension to the first inclined surface 84, thereby allowing a truck to drive up both inclined surfaces and onto the second top surface 92. When the second ramp member 88 is in the inactive position, a truck can be backed up the first inclined surface 84 and onto the first top surface 80. When both the first and second ramp members 78,88 are in the inactive position, the truck will stay on the driveway 80 and will not contact the ramp members. Accordingly, it can be seen that the truck leveler of FIGS. 7 and 8 provides a multi-position ramp that allows a truck to be positioned either on the driveway or in one of two raised positions. It should be appreciated that the truck leveler of FIGS. 6 and 7 could be provided with automatic actuators to allow the first and second ramp members 78,88 to be selectively pivoted by remote activation.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A loading dock having a truck leveler for allowing the truck to be positioned at different heights, said loading dock comprising:

a dock surface;

a driveway extending from said dock surface and positioned at a level below said dock surface, said driveway defining a tire path along which a truck tire will travel when a truck is backed toward said dock surface; and a ramp pivotally mounted on said driveway, such that said ramp pivots about an axis substantially parallel to said tire path, said ramp being pivotable from an active position aligned with the tire path to an inactive position out of the tire path.

2. A loading dock as claimed in claim 1, wherein said pivotal mounting is provided by a hinge having a first member securely interconnected with said driveway and a second member pivotally secured to said first hinge member and securely interconnected with said ramp.

3. A loading dock as claimed in claim 1, wherein said ramp rotates about 90° when moving from said active position to said inactive position.

4. A loading dock as claimed in claim 1, further comprising a power actuator operatively connected with said ramp and positioned to pivot said ramp between said active and inactive positions.

5. A loading dock as claimed in claim 4, wherein said power actuator comprises a hydraulic cylinder.

6. A loading dock as claimed in claim 4, further comprising a wheel chock having attaching means for selectively attaching said wheel chock to said ramp.

7. A loading dock as claimed in claim 1, further comprising a wheel chock having attaching means for selectively attaching said wheel chock to said ramp.

8. A method of positioning a truck at a loading dock having a dock surface, a driveway defining a tire path, and a ramp pivotally mounted on the driveway, said method comprising the steps of:

pivoting the ramp about an axis that is substantially parallel to the driveway from an active position aligned with the tire path to an inactive position out of the tire path; and backing the truck over the driveway and toward the dock surface such that a tire of the truck travels along the tire path.

9. A method as claimed in claim 8, wherein said pivoting step comprises pivoting the ramp about 90°.

10. A multi-position ramp adapted to be positioned on a base surface adjacent to an elevated surface, comprising:

a first ramp member including:

a bottom surface adapted to be positioned on the base surface;

a top surface adapted to support a vehicle when said bottom surface is positioned on the base surface, said top surface being positioned at a height substantially below the elevated surface; and a first inclined surface adapted to act as a ramp to said top surface when said bottom surface is positioned on the base surface; and a second ramp member pivotally connected to said first ramp member and including a second inclined surface and a second top surface, said second ramp member being movable relative to said first ramp member between an active position, where said second inclined surface acts as an extension of said first inclined surface and said second top surface is positioned substantially below the elevated surface, and an inactive position.

11. A multi-position ramp as claimed in claim 10, wherein said second ramp member is pivotable 90° relative to said first ramp member when said bottom surface is positioned on the base surface.

* * * * *